(12) United States Patent
Pressler

(10) Patent No.: US 6,517,080 B1
(45) Date of Patent: Feb. 11, 2003

(54) SEAL MATERIAL HAVING ANISOTROPIC PROPERTIES

(75) Inventor: Jonathan W. Pressler, Peoria, IL (US)

(73) Assignee: Caterpillar Inc, Peoria, IL (US)

( * ) Notice: Subject to any disclaimer, the term of this patent is extended or adjusted under 35 U.S.C. 154(b) by 0 days.

(21) Appl. No.: 09/357,092

(22) Filed: Jul. 19, 1999

(51) Int. Cl.[7] ............... F16J 9/26; F16J 15/20
(52) U.S. Cl. ............ 277/440; 277/535; 277/540; 277/908; 277/944
(58) Field of Search ............... 277/440, 534, 277/535, 540, 627, 650, 944, 908

(56) References Cited

U.S. PATENT DOCUMENTS

| | | | |
|---|---|---|---|
| 4,116,914 A | | 9/1978 | Coran et al. |
| 4,305,591 A | * | 12/1981 | De Sivry et al. |
| 4,428,590 A | * | 1/1984 | Pippert et al. |
| 4,592,938 A | * | 6/1986 | Benoit ............ 428/35 |
| 4,874,665 A | * | 10/1989 | Doheny ............ 428/345 |
| 4,908,253 A | * | 3/1990 | Rasmussen |
| 5,124,397 A | * | 6/1992 | Kanazawa et al. ...... 524/496 |
| 5,306,021 A | * | 4/1994 | Morvant |
| 5,325,623 A | * | 7/1994 | Sakuraoka et al. |
| 5,344,691 A | * | 9/1994 | Hanschen et al. ........ 428/152 |
| 5,366,793 A | * | 11/1994 | Fitts, Jr. et al. ........ 428/198 |
| 5,385,775 A | * | 1/1995 | Wright ............. 428/284 |
| 5,401,564 A | * | 3/1995 | Lee et al. |
| 5,409,996 A | * | 4/1995 | Shinohara et al. |
| 5,460,678 A | | 10/1995 | Reinsma et al. |
| 5,462,708 A | * | 10/1995 | Swenson et al. ....... 264/174.11 |
| 5,492,342 A | | 2/1996 | Dartnall et al. |
| 5,511,797 A | | 4/1996 | Nikirk et al. |
| 5,520,422 A | | 5/1996 | Friedrich et al. |
| 5,532,299 A | * | 7/1996 | Dubois |
| 5,545,431 A | | 8/1996 | Singh et al. |
| 5,599,418 A | * | 2/1997 | Pithouse et al. |
| 5,603,511 A | | 2/1997 | Keyser, Jr. et al. |
| 5,627,236 A | | 5/1997 | Deyrup et al. |
| 5,628,519 A | * | 5/1997 | Kakehi |
| 5,639,100 A | | 6/1997 | Garrigues et al. |
| 5,678,829 A | | 10/1997 | Kalsi et al. |
| 5,882,012 A | * | 3/1999 | Niwa et al. ............ 277/407 |
| 5,885,908 A | * | 3/1999 | Jaeger et al. ........... 442/59 |
| 6,080,474 A | * | 6/2000 | Oakley et al. .......... 428/323 |
| 6,143,823 A | * | 11/2000 | Wehrmann et al. ........ 525/66 |

FOREIGN PATENT DOCUMENTS

| | | | |
|---|---|---|---|
| EP | 0 375 389 A1 | | 6/1990 |
| RU | 2079754 C | * | 5/1997 |
| WO | WO 99/61526 | | 2/1999 |

OTHER PUBLICATIONS

Patent Abstracts of Japan—No. 02305884; Date: Dec. 19, 1990 Applicant: N O K Sogo Gijutsu.
Patent Abstracts of Japan—No. 11292990; Date Oct. 26, 1999 Applicant: Kureha Elastomer KK.

* cited by examiner

Primary Examiner—Anthony Knight
Assistant Examiner—Alison K. Pizkard
(74) Attorney, Agent, or Firm—Haverstock, Garrett & Roberts; Steve M Hanley

(57) ABSTRACT

A material comprised of two different polymers so that the material exhibits anisotropic properties. The anisotropic properties exhibit hardness and wear resistance along with flexibility. The anisotropic material is made up of a hard segment polymer and a soft segment polymer having contact with each other. This anisotropic material can be used to make seals, which exhibit these same properties and are therefore appropriate for use in high-pressure situations, where they will have a longer life than seals currently on the market.

6 Claims, 1 Drawing Sheet

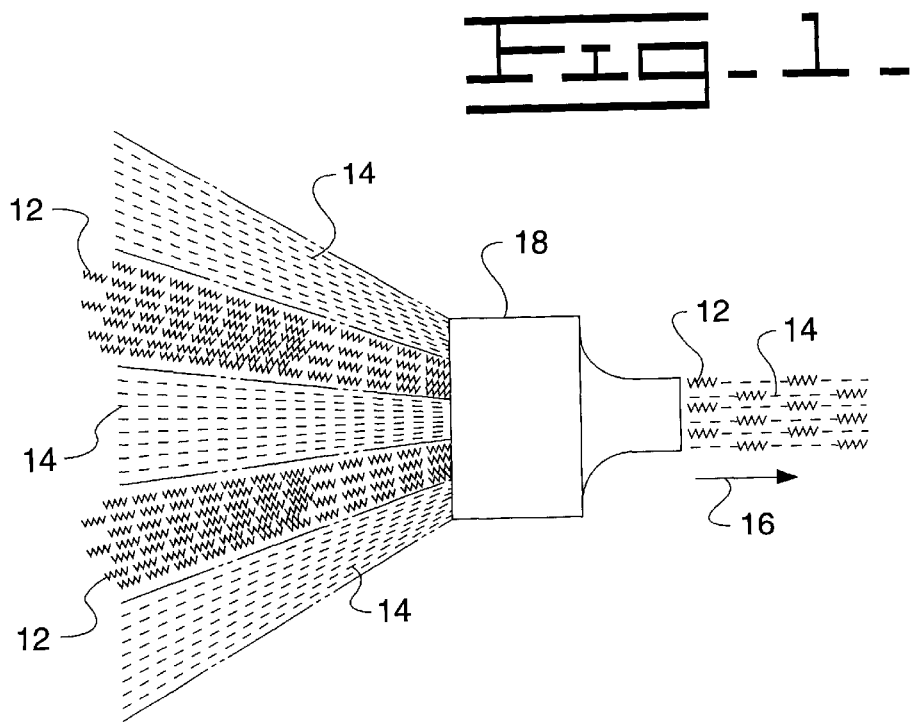
Fig. 1
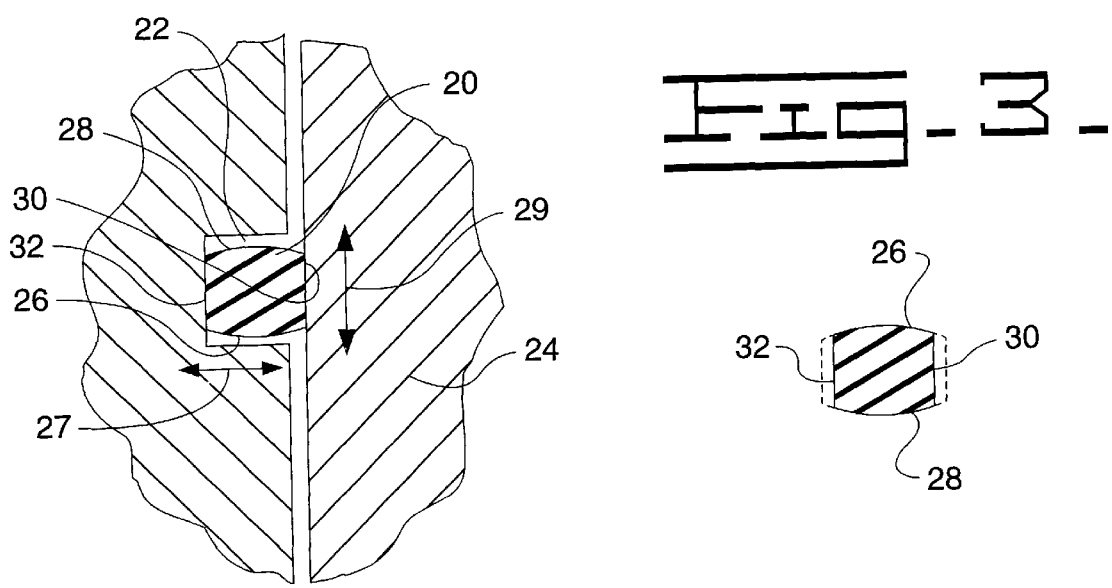
Fig. 2
Fig. 3

SEAL MATERIAL HAVING ANISOTROPIC PROPERTIES

TECHNICAL FIELD

This invention relates generally to a material comprised of two different compositions so that the material exhibits anisotropic properties, the material is comprised of a stiff, wear resistant material and a flexible material, wherein each material has a different modulus of elasticity. More particularly, the present invention includes a seal comprised of such material, so that the seal exhibits anisotropic properties.

BACKGROUND ART

Currently, seals, such as rubber o-rings are used in static and dynamic environments including pistons, hydraulics, pumps, fuel systems and brakes. Seals have a well-known tendency to break down and fail due to erosion and nibbling. Erosion is caused by the constant action and movement under varying pressures and conditions which the seal experiences. Nibbling, the breakdown of small pieces of the seal over time is also aggravated due to the pressure placed on the seal. Both erosion and nibbling are exaggerated in high-pressure radial sealing situations. Due to this tendency to breakdown there is great need for a seal made from materials which can withstand high-pressure situations without experiencing erosion and nibbling which cause seals to fail, and in turn can cause machinery to fail leading to production shutdowns while these seals are replaced. A material having a high modulus of elasticity, which increases the stiffness of the material, could alleviate the problems due to erosion and nibbling. However, use of these hard materials leads to a different set of problems. The stiffness of these high modulus materials which enables them to withstand high-pressure situations reduces the elasticity. This loss of elasticity reduces sealing performance in both high and low-pressure situations. Material elasticity provides a sealing force which ensures the seal remains in contact with the piston or shaft and the seal bore during use. This prevents leakage and the breakdown of the sealing action. Lack of elasticity is a problem associated with seals having a high degree of stiffness. Some elasticity is also required to allow for the installation of these seals. Seals, which exhibit the stiffness required to avoid erosion and nibbling, are extremely difficult to install and in some instances installation has been impossible.

These problems lead to the current situation where manufacturers must make a choice between three alternatives. First, they can use seals which exhibit enough stiffness to be wear resistant but do not exhibit good sealing capability and are extremely difficult to install. Second, they can use seals which have enough elasticity to allow for sealing force requirements and installation but are not wear resistant and tend to erode, experience nibbling, and breakdown frequently. Finally, they can use seals having two or three components which must work together to deliver the necessary properties of wear resistance, sealing capabilities and ease of installation. However these seals are prone to develop problems due to the fact two or more components must work together to form the seal. Considering the drawbacks of each of the above alternatives, a better solution is needed.

What is required is a seal, which exhibits the properties of a high modulus of elasticity in the axial direction, that is in the same axis as the piston or shaft, and a low modulus of elasticity, along with elastomeric properties in a second direction, perpendicular to the first direction. The modulus of elasticity being a measure of the softness or stiffness of the material, i.e.: a coefficient of elasticity which represents the ratio of stress to strain as a material is deformed under dynamic load. The higher the modulus of elasticity, the stiffer and more resistant to wear, nibbling, and erosion the material is. Seals having such anisotropic properties, in that the seals exhibit increased stiffness and wear resistance to withstand high-pressure applications in a first, axial direction, while having enough elasticity in a second direction, perpendicular to the first direction, to exhibit good sealing force and easy installation are desired.

Accordingly, the present invention is directed at overcoming one or more of the problems as set forth above.

DISCLOSURE OF THE INVENTION

In one aspect of the present invention a material, having anisotropic properties, is made by joining a hard segment polymer with a soft segment polymer. The hard segment polymer and the soft segment polymer are joined so that the material has a modulus of elasticity in a first direction and a lower modulus of elasticity, along with elastomeric properties in a second direction, perpendicular to the first direction. The hard segment polymer is selected from polymers of the engineering thermoplastic family that are melt processable. These hard segment polymers exhibit a high modulus of elasticity, such a high modulus of elasticity increases the stiffness of the material. The increased stiffness allows the material to withstand high-pressure situations without experiencing erosion, wear, and nibbling effects. This has the desired effect of increasing the lifespan of the material because the hard segment polymer provides greater wear, erosion, and nibbling resistance due to its high modulus of elasticity.

The soft segment polymer is selected from the family of elastomeric polymers used for sealing. These soft segment polymers exhibit a lower modulus of elasticity than the hard segment polymers. Including these soft segment polymers with their low modulus of elasticity and elastomeric properties in the material, ensures the material will be somewhat elastic. Some elasticity is necessary to ensure the material will stretch and retract and/or compress and expand rapidly to approximately its original size. Elasticity also makes installation of the material in various applications easier.

The hard segment polymer and the soft segment polymer are processed in a way that ensures the stiffness provided by the hard segment polymer and the elasticity provided by the soft segment polymer are both present in the finished material, thus ensuring a material displaying the desired anisotropic properties. Any available means which is well known in the art can be used to join the hard segment polymer with the soft segment polymer as long as the means chosen allows the material to have the desired characteristics of stiffness and wear resistance in a first direction, along with elasticity in a second direction, perpendicular to the first direction. One means of joining the polymers would be to blend the polymers without a chemical bond or to crosslink the polymers to form a crosslinked blend. A crosslinking agent can be added to aid in forming this crosslinked blend.

Due to this combination of hard segment polymer and soft segment polymer, the material tends to exhibit anisotropic properties. Anisotropic properties refer to the fact the material exhibits stiffness and wear resistance in a first direction while exhibiting elasticity in a second direction, perpendicular to the first direction. This is possible because when the hard segment and soft segment polymer chains are processed in a laminar flow region of a mechanism for processing the material, such as, but not limited to an extruder, the polymer chains tend to orient along the direction of flow in an elongated form, which leads to a material exhibiting these anisotropic properties. Polymer chains are not stable in this elongated form and therefore the polymer chains will not stay in the elongated form for long. Thus, it is necessary to cool or freeze the material so the polymers will remain in the elongated form and thereby maintain the desired orientation. The cooling or freezing of the material can be accomplished using any fluid medium known in the art. The only requirement being that the temperature of the fluid medium be less than the temperature of the processed material so cooling will take place.

Seals manufactured from this anisotropic material will exhibit the stiffness and wear resistance required to withstand erosion and nibbling in a first direction which is lying in the same axis as the piston or shaft to be sealed, while also exhibiting elasticity in a second direction, perpendicular to the first direction, which ensures easy installation on the piston or shaft. These anisotropic seals are perfectly suited for high-pressure situations in that the anisotropic seals will not breakdown or erode as quickly as seals which are currently used. Another major advantage of these seals is their elasticity, which allows for the easy installation of the seals and once installed ensures a good sealing force between the seal and the piston or shaft.

BRIEF DESCRIPTION OF THE DRAWINGS

FIG. 1 is a diagram indicating the polymers orienting in the direction of flow;

FIG. 2 is a cross-sectional view of a seal in a bore of a piston or shaft embodying the principles of the present invention;

FIG. 3 is an enlarged cross-sectional view of the seal as shown in FIG. 2, indicating the direction of elasticity of the seal.

BEST MODE FOR CARRYING OUT THE INVENTION

The present invention relates to an anisotropic material designed to withstand nibbling and erosion for use in conditions that require stiffness, wear resistance and elasticity. This material is used to manufacture seals which are perfectly suited for use in high-pressure situations. These seals exhibit stiffness in a first direction, which allows the seals to withstand corrosive effects such as erosion and nibbling. The seals also exhibit enough elasticity in a second direction, perpendicular to the first direction, to allow for easy installation and good sealing force once the seal is in place.

The material is comprised of a hard segment polymer having a modulus of elasticity high enough to exhibit the stiffness characteristics required for the material being made, and a soft segment polymer having a modulus of elasticity lower than the modulus of elasticity of the hard segment polymer, along with elastomeric properties. The modulus of elasticity for the hard segment polymer is customarily in the range of 1500 to 3000 MegaPascals (MPa), although as stated above, the modulus of elasticity for the hard segment polymer is mainly limited by the stiffness requirements of the seal. The modulus of elasticity for the soft segment polymer is customarily in the range of 2 to 15 MegaPascals (MPa). Again, the modulus of elasticity for the soft segment polymer is mainly limited by the elasticity requirements of the seal. The hard segment polymer can be any member of the engineering thermoplastic family that is melt processable including but not limited to extruded, machined, cast, molded, or stamped. Engineering thermoplastics are characterized as having stiffness, strength, machinability, dimensional stability, non-flammability, and wear resistance to corrosion, most acids, solvents, heat and pressure. Appropriate engineering thermoplastics include, those members of polyamides, polyimides, polyether ether ketones (PEEK), polyether ketones (PEK), polyphenaline sulfides (PPS), polyesters, polyolefins, and combinations thereof which are thermoplastic. The hard segment polymer can be present in an amount equal to between about 10% and about 90% by weight of the material.

The soft segment polymer can be any common elastomeric polymer used for sealing. These common elastomeric polymers are chosen based on their operating temperature capabilities, fluid compatibility requirements and cost. These soft segment polymers includes nitrites (NBR), hydrogenated nitrites (HNBR), fluorocarbons (FKM), silicones (MVQ, etc.), polyacrylates (PA), ethylene propylene terpolymers (EPDM), and combinations thereof. The soft segment polymer can be present in an amount equal to between about 10% and about 90% by weight of the material.

The hard segment polymer and the soft segment polymer are processed so that the polymers orient in the direction of flow 16 as shown in FIG. 1. This is due to the laminar flow region of the mechanism used to process the material, along with the actual chemical composition of the hard segment 12 and soft segment polymers 14. In other words, the hard segment polymer chain 12 and the soft segment polymer chain 14 orient in an elongated state which is achieved by processing the polymer chains 12 and 14 through or in a laminar flow region of the mechanism used to process the material, such as an extruder 18. The laminar flow region is a region devoid of the mixing phenomena which are caused by eddies common in the turbulent flow regions. The process aligns the hard segment polymer chain 12 and the soft segment polymer chain 14 in the direction of flow 16 as the polymers are processed through the laminar flow region of the extruder 18. However, the polymer chains 12 and 14 will not stay in the elongated form required for this orientation without being cooled or frozen in this elongated form to maintain the desired orientation. The cooling or freezing of the material can be accomplished using any fluid medium known in the art. The only requirement being that the temperature of the fluid medium is less than the temperature of the processed material so cooling will take place. This entire process results in material which exhibits anisotropic properties. The material exhibits stiffness and wear resistance in a first direction, parallel to flow 16 through extruder 18, while retaining its elasticity in a second direction, perpendicular to the first direction. The hard segment polymer and soft segment polymer are oriented throughout the material in a way that enables the final material to display the desired anisotropic properties.

An example of this would be a seal attached to a piston in a high-pressure system. The seal must have stiffness so it does not erode or breakdown over time. The stiffness in a first direction on the same axis as the piston or shaft would be supplied by the hard segment polymer which has a high modulus of elasticity, this ensures the walls of the seal are stiff and wear resistant. In order to be installed on the piston and to provide good sealing force with the piston once installed, the seal must contain some degree of elasticity. This is provided by the soft segment polymer, which has a low modulus of elasticity and elastomeric properties in a second direction perpendicular to the first direction.

The hard segment polymer and the soft segment polymer can be joined by any means well known in the art which will allow the material to exhibit anisotropic properties. The material must exhibit stiffness and wear resistance as provided by the hard segment polymer along with exhibiting elasticity which is provided by the soft segment polymer. One such means of joining these polymers would be to crosslink them to thereby form a crosslinked blend. This crosslinking can occur with or without the addition of a crosslinking agent, which would help the polymers to crosslink. The crosslinking agent could be a free-radical crosslinking agent. Examples of appropriate free-radical crosslinking agents for this system include peroxides and siloxanes. These crosslinking agents can be present in the range of 1.0 percent to 3.0 percent by weight of the material.

Another means of joining the hard and soft segments during processing is to rely on van der Waals forces. Thus, the two materials could be joined entirely by van der Waals forces or a combination of van der Waals forces and various levels of chemical crosslinking.

The material exhibits stiffness, which imparts wear resistance to the material so that it can withstand high-pressure situations without experiencing breakdown, erosion, or nibbling. The material also exhibits elasticity, which ensures the material will return to its original shape when the pressure changes, this guarantees good sealing force when the material is manufactured into a seal, and provides the material with the ability to stretch to allow for easy installation.

Due to its unique characteristics this material is perfectly suited for use in seals in high-pressure situations. These seals require both the stiffness and wear resistance found under high modulus of elasticity conditions and the elasticity found under low modulus of elasticity conditions.

Referring more particularly to the drawings, a seal 20 embodying the principles of the present invention is shown in FIG. 2. This seal 20 is equally suited for use as a static as well as a dynamic radial reciprocating seal. Depending on the material chosen, the seal 20 can be extruded, machined, cast, molded, stamped or a combination thereof. The seal 20 is shown installed in a bore 22. The bore 22 can typically be located in a piston or shaft 24 as shown in FIG. 2.

This seal 20 has opposed walls 26 and 28 and opposed faces, 30 and 32. The opposed walls 26 and 28 of the seal 20 are stiff in a first direction 29, on the same axis as the piston or shaft, due to the presence of the hard segment polymer in the material. As shown in FIGS. 2 and 3, the seal 20 demonstrates elasticity in a second direction 27, perpendicular to the first direction 29.

The stiffness of the seal accompanied by the required elasticity is due to the joining of a hard segment polymer from the engineering thermoplastic family that is melt processable, such as polyamides, polyimides, polyether ether ketones (PEEK), polyether ketones (PEK) and polyphenaline sulfides (PPS) polyesters and polyolefins with a soft segment polymer from the family of elastomeric polymers used for sealing, such as nitrites (NBR), hydrogenated nitrites (HNBR), fluorocarbons (FLCM), silicones (MVQ, etc.), polyacrylates (PA) and ethylene propylene terpolymers (EPDM). The hard segment polymer joining with the soft segment polymer produces seals which display anisotropic properties. The seal is anisotropic in that it is stiff and wear resistant in a first direction, on the same axis as the piston or shaft, while at the same time demonstrating elasticity in a second direction, perpendicular to the first direction. These characteristics are due to the orientation of the hard segment polymer and soft segment polymer when the material is formed. The orientation occurs because the polymers are processed in a laminar flow region which creates the elongated orientation that forms a material having the required anisotropic properties.

The hard segment polymer and the soft segment polymer of the seal material can be joined to by any means well known in the art which will allow the material to exhibit anisotropic properties. If desired, these polymers can be joined to form a crosslinked blend. A crosslinking agent such as a free-radical crosslinking agent can be added to aid in forming the copolymer network. Examples of free-radical crosslinking agents include, peroxides and siloxanes.

The hard segment polymer and the soft segment polymer of the seal material can be varied so that the seal material has the appropriate degree of stiffness, wear resistance, and elasticity to meet the requirements of the system which will utilize the seals. Obviously, the stiffness of the first modulus of elasticity will depend on which hard segment polymer is used. This determination will be based on the requirements of the system in which the desired seal will be placed. Once that is determined, a soft segment polymer having an appropriate lower modulus of elasticity can be chosen, again based on the elasticity requirements of the system in which the seal will be used. This will allow the seal to have anisotropic properties which exhibit the appropriate degree of stiffness, wear resistance and elasticity.

EXAMPLE

Hypothetical Example 1

The user could take two polymers, nylon 6 having a modulus of elasticity of about 2000 MegaPascals (MPa) and nitrile (NBR) having a modulus of elasticity of about 8 MPa. These two polymers could be put into the melt phase independently through the industry common practices of mechanical shear and heat. These two polymers could then be brought together and "mixed" while both are still in the melt phase, by the use of pressure to force flow in a single direction. An example would be bringing both together into an extrusion die and forcing them through a series of constricting passages which force intermixing and eventually produce one stream of intermixed polymer. All the while, the polymers would be traveling in a singular direction of flow, thus producing the desired polymer orientation. Also, the crosslinking chemicals are distributed in the individual polymers before melt processing. For example, peroxide could be distributed in the nylon, and thus any crosslinking could not begin until the two polymer phases meet each other during the mixing process in the melt phase.

Industrial Applicability

The present material having anisotropic properties has utility for use in a wide variety of applications which require material that can withstand high-pressure situations without experiencing erosion, nibbling or breakdown while remaining elastic to ensure easy installation and good sealing force. Applications include pistons, pumps, fuel systems and brakes. This anisotropic material has the advantage of being stiff enough to work in these high-pressure situations without breaking down while retaining the elasticity to provide sealing force and allow for installation.

Seals produced with this anisotropic material will be an improvement over what is currently available since these anisotropic seals will impart stiffness which allows them to endure high-pressure systems in a first direction on the same axis as the piston or shaft, while exhibiting elasticity in a second direction, perpendicular to the first direction, which makes them easy to install and enables them to maintain sealing force over time.

Other aspects, objects and advantages of the present invention can be obtained from a study of the drawings, the disclosure and the appended claims.

What is claimed is:

1. An annular seal for use in conditions requiring resistance to erosion and nibbling, said annular seal comprising:

opposed faces and opposed walls wherein one of said faces engages a rotating or reciprocating shaft, said annular seal is made of an anisotropic material comprising a mixture of:

(a) a hard segment polymer which imparts stiffness and wear resistance, the hard segment polymer being selected from the group consisting of polyamides, polyimides, polyether ether ketones, polyether ketones, polyphenaline sulfides, polyesters, and combinations thereof; and, (b) a soft segment polymer which imparts elasticity, the soft segment polymer being selected form the group consisting of nitrites, hydrogenated nitrites, fluorocarbons, silicones, polyacrylates, and combinations thereof;

wherein said hard and soft segment polymers are oriented in such a way that said annular seal exhibits stiffness and wear resistance in a first direction, along said shaft, and elasticity in a second direction, perpendicular to the first direction.

2. The anisotropic material of claim 1 wherein said hard segment polymer is present in an amount equal to between about 10% and about 90% by weight of said anisotropic material.

3. The anisotropic material of claim 1 wherein said soft segment polymer is present in an amount equal to between about 90% and about 10% by weight of said anisotropic material.

4. The anisotropic material of claim 1 wherein said hard segment polymer has a modulus of elasticity in the range of 1500 to 3000 MegaPascals.

5. The anisotropic material of claim 1 wherein said soft segment polymer has a modulus of elasticity in the range of 2 to 15 MegaPascals.

6. The anisotropic material of claim 1 wherein said hard segment polymer and said soft segment polymer form a crosslinked blend.

\* \* \* \* \*

UNITED STATES PATENT AND TRADEMARK OFFICE
CERTIFICATE OF CORRECTION

PATENT NO.      : 6,517,080 B1
DATED           : February 11, 2003
INVENTOR(S)     : Jonathan W. Pressler It is certified that error appears in the above-identified patent and that said Letters Patent is hereby corrected as shown below:

<u>Column 7,</u>
Line 25, both occurrences, "nitrites" should read -- nitriles -- so line 25 reads
--consisting of nitriles, hydrogenated nitriles, --

Signed and Sealed this

Twenty-ninth Day of July, 2003

JAMES E. ROGAN
*Director of the United States Patent and Trademark Office*